United States Patent
Kwon et al.

(10) Patent No.: US 10,661,919 B2
(45) Date of Patent: May 26, 2020

(54) DOCKING SIMULATOR

(71) Applicant: KOREA AEROSPACE RESEARCH INSTITUTE, Daejeon (KR)

(72) Inventors: Jae Wook Kwon, Daejeon (KR); Yong Sik Chun, Daejeon (KR); Il Young Kim, Daejeon (KR); Dong Young Rew, Daejeon (KR); Gi Hyuk Choi, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 309 days.

(21) Appl. No.: 15/822,901

(22) Filed: Nov. 27, 2017

(65) Prior Publication Data
US 2018/0162562 A1 Jun. 14, 2018

(30) Foreign Application Priority Data
Dec. 14, 2016 (KR) .......................... 10-2016-0170171

(51) Int. Cl.
*G09B 19/16* (2006.01)
*B64G 1/64* (2006.01)
(Continued)

(52) U.S. Cl.
CPC ............... *B64G 1/646* (2013.01); *B64G 7/00* (2013.01); *B64G 4/00* (2013.01); *B64G 2007/005* (2013.01)

(58) Field of Classification Search
USPC ... 434/29, 30, 32, 34, 35, 37, 49, 54, 55, 59
See application file for complete search history.

(56) References Cited

U.S. PATENT DOCUMENTS 3,191,316 A * 6/1965 Dryden .................... B64G 1/62
434/34
5,110,294 A * 5/1992 Brand ...................... B64G 7/00
434/34
(Continued)

FOREIGN PATENT DOCUMENTS

JP H07-277300 A 10/1995
KR 10-0583953 B1 5/2006

OTHER PUBLICATIONS

Jim Hodges, "Ingenuity and Improvisation", Ask Magazine, vol. 36, Sep. 1, 2009 [retrieved online Nov. 26, 2019]. (Year: 2009).*
(Continued)

*Primary Examiner* — Kurt Fernstrom
(74) *Attorney, Agent, or Firm* — Rabin & Berdo, P.C.

(57) ABSTRACT

A docking simulator according to an exemplary embodiment of the present disclosure is a docking simulator capable of mimicking docking between two flight vehicles in a zero gravity environment, the docking simulator including: a passive module which is disposed at a preset position; and an active module which performs docking with the passive module by approaching the passive module while performing a translational motion. According to the present disclosure, the docking simulator capable of performing, on the ground, a logic verification test for rendezvous docking between the two flight vehicles in the space in the zero gravity environment is implemented, and as a result, it is possible to perform more various logic verification tests for rendezvous docking by mimicking the rendezvous docking by using actual objects.

10 Claims, 6 Drawing Sheets

(51) Int. Cl.
*B64G 7/00* (2006.01)
*B64G 4/00* (2006.01)

(56) References Cited

U.S. PATENT DOCUMENTS

| | | | | |
|---|---|---|---|---|
| 5,207,110 | A * | 5/1993 | Chew | B64G 7/00 |
| | | | | 248/328 |
| 5,364,046 | A | 11/1994 | Dobbs et al. | |
| 5,489,212 | A * | 2/1996 | Yoshimoto | A63G 31/16 |
| | | | | 434/34 |
| 7,441,473 | B2 * | 10/2008 | MacCallum | B64G 7/00 |
| | | | | 434/34 |
| 2004/0248071 | A1 * | 12/2004 | Bedziouk | A63B 24/00 |
| | | | | 434/247 |
| 2008/0070196 | A1 * | 3/2008 | Luty | G09B 9/52 |
| | | | | 434/34 |
| 2016/0163218 | A1 * | 6/2016 | Chesi | B64G 7/00 |
| | | | | 434/34 |

OTHER PUBLICATIONS

Technical Facilities Resume—Rendezvous Docking Simulator, Jul. 1, 1966 [retrieved online Nov. 26, 2019]. (Year: 1966).*
B. Johannes et al, "The Mars500 Experiment '6DF'—A Teaching and Testing Approach—First Results", Jan. 2011 [retrieved online Nov. 26, 2019]. (Year: 2011).*
Hong Sung Kyung et al, "Research Trends of the 5-DOF Experimental Platform for Satellite Rendezvous and Docking", The Journal of Aerospace Industry 79, 2013. 12, 37-58 (22 pages), Aerospace Industry Research Institute, Sejong University.

* cited by examiner

DOCKING SIMULATOR

CROSS-REFERENCE TO RELATED APPLICATIONS

This application claims the priority of Korean Patent Application No. 10-2016-0170171 filed on Dec. 14, 2016, in the Korean Intellectual Property Office, the disclosure of which is incorporated herein by reference.

BACKGROUND

Field

The present disclosure relates to a docking simulator for performing a logic verification test for rendezvous docking between two flight vehicles in a zero gravity environment.

Description of the Related Art

Recently, as an importance of an spacecraft service using a small-sized spacecraft or the like in a space environment is emphasized, researches on a rendezvous and docking, which are key technologies for connecting two flight vehicles exposed to a space environment, are progressively increased.

In order to perform an experiment on the rendezvous docking, there is a need for a technology for tracking positions of parts to be docked based on image data transferred from the two flight vehicles, and precisely controlling positions and postures of the flight vehicles by using a computer.

However, enormous costs are required and a great risk is involved in performing the experiment on the rendezvous docking in an actual space environment to develop and verify the technology, and as a result, there is an acute need for establishment of a test environment for performing, on the ground, the experiment on the rendezvous docking by mimicking a space environment.

Document of Related Art

[Patent Document]
(Patent Document 1) Korean Patent No. 10-0583953

SUMMARY

An object of the present disclosure is to provide a docking simulator capable of performing, on the ground, a logic verification test for rendezvous docking between two flight vehicles by mimicking the two flight vehicles exposed to a space environment.

A docking simulator according to an exemplary embodiment of the present disclosure is a docking simulator capable of mimicking docking between two flight vehicles in a zero gravity environment, the docking simulator including: a passive module which is disposed at a preset position; and an active module which performs docking with the passive module by approaching the passive module while performing a translational motion.

The active module may have a structure capable of performing 6-degree-of-freedom motions including an X-axis motion, a Y-axis motion, a Z-axis motion, a pitch motion, a yaw motion, and a roll motion.

The active module may include: a first rotating unit which is disposed in the air by being spaced apart from the ground surface, maintains balance so that a central axis is in parallel with the ground surface, and rotates about any one of an X axis, a Y axis, and a Z axis; and a conveying unit which supports the first rotating unit so that the first rotating unit is disposed in the air, and moves straight in a direction of any one of the X axis, the Y axis, and the Z axis.

The first rotating unit may include: a first coupling part which is coupled to the passive module when performing the docking; a first support shaft which is rotatably coupled to the conveying unit and supports the first coupling part; and a first posture control unit which is installed on the first support shaft to maintain balance of the first support shaft, and controls a rotation of the first support shaft.

The first posture control unit may include: a first control unit which is installed at an end portion of the first support shaft, and controls the pitch of the first rotating unit by adjusting a rotation amount of the first support shaft about the Y axis; second control units which are installed at one side and the other side of the first support shaft, respectively, in a direction intersecting a central axis of the first support shaft, and controls the yaw of the first rotating unit by adjusting a rotation amount of the first support shaft about the X axis; and a third control unit which is installed on the conveying unit, and controls the roll of the first rotating unit by adjusting a rotation amount of the first support shaft about the Z axis.

The conveying unit may include: a first straight moving unit which supports the first rotating unit, and moves the first rotating unit straight in the directions of the X axis, the Y axis, and the Z axis when the first rotating unit is positioned within a preset distance from the passive module; and a second straight moving unit which supports the first straight moving unit, and moves the first straight moving unit straight in the directions of the X axis and the Y axis until the first rotating unit is positioned within a preset distance from the passive module.

The first straight moving unit may include: a horizontal moving unit which is installed on the second straight moving unit and moves straight in a longitudinal direction of the second straight moving unit; and a vertical moving unit which is installed on the horizontal moving unit, moves in the directions of the X axis and the Y axis, extends in the Z-axis direction from the horizontal moving unit, and moves the first rotating unit, which is installed outside, straight in the Z-axis direction.

The second straight moving unit may include: a first main moving unit which is coupled to the first straight moving unit, and moves straight in the Y-axis direction; and a second main moving unit which is coupled to the first main moving unit and moves the first main moving unit straight in the X-axis direction.

The passive module may include: a second rotating unit which is disposed in the air by being spaced apart from the ground surface, maintains balance so that a central axis is in parallel with the ground surface, and rotates about at least one of an X axis, a Y axis, and a Z axis; and a support unit which supports the second rotating unit so that the second rotating unit is disposed in the air.

The second rotating unit may include: a second coupling part which is coupled to the active module when performing the docking; a second support shaft which is rotatably coupled to the support unit and supports the second coupling part; and a second posture control unit which is installed on the second support shaft to maintain balance of the second support shaft, and controls a rotation of the second support shaft.

The second posture control unit may include: a first control unit which is installed at an end portion of the second support shaft, and controls the pitch of the second rotating unit by adjusting a rotation amount of the second support shaft about the Y axis; second control units which are installed at one side and the other side of the second support shaft, respectively, in a direction intersecting a central axis of the second support shaft, and controls the yaw of the second rotating unit by adjusting a rotation amount of the second support shaft about the X axis; and a third control unit which is installed on the support unit, and controls the roll of the second rotating unit by adjusting a rotation amount of the second support shaft about the Z axis.

The support unit may include: a support shaft member which supports the second rotating unit; and a fixing plate which is installed on the ground surface and supports the support shaft member.

According to the present disclosure, the docking simulator capable of performing, on the ground, a logic verification test for rendezvous docking between the two flight vehicles in the space in the zero gravity environment is implemented, and as a result, it is possible to perform more various logic verification tests for rendezvous docking by mimicking the rendezvous docking by using actual objects, and it is possible to derive optimum rendezvous docking logic data by finding problems occurring when performing the actual rendezvous docking and by solving the problems.

In addition, the active module connected to the passive module is structured to be able to perform the 6-degree-of-freedom motions including the X-axis motion, the Y-axis motion, the Z-axis motion, the pitch motion, the yaw motion, and the roll motion, and as a result, it is possible to implement a more precise docking process.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Hereinafter, an exemplary embodiment of the present disclosure will be described in detail with reference to the accompanying drawings.

Figure 1:
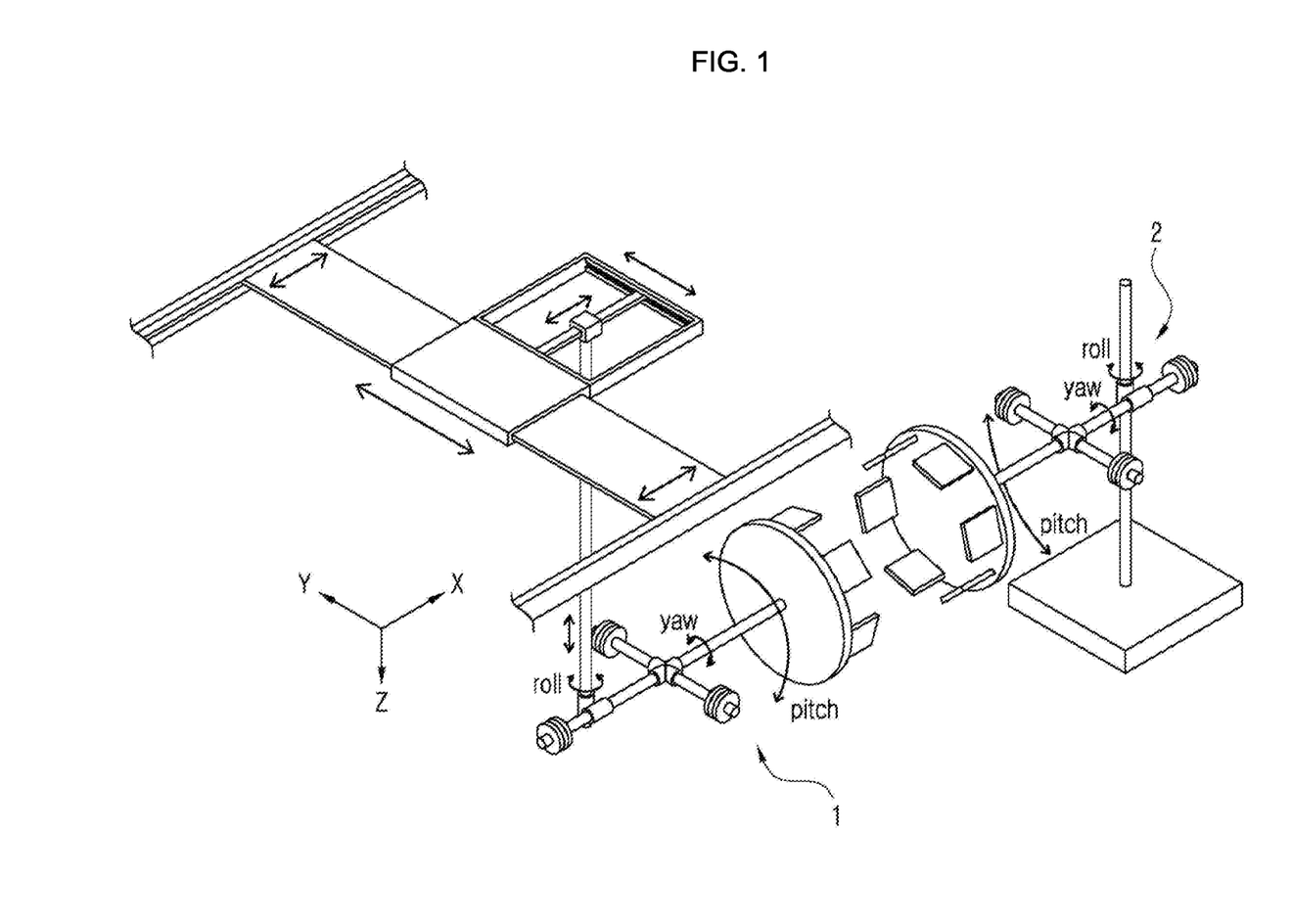
FIG. 1 is a view schematically illustrating a docking simulator according to an exemplary embodiment of the present disclosure.
Figure 2:
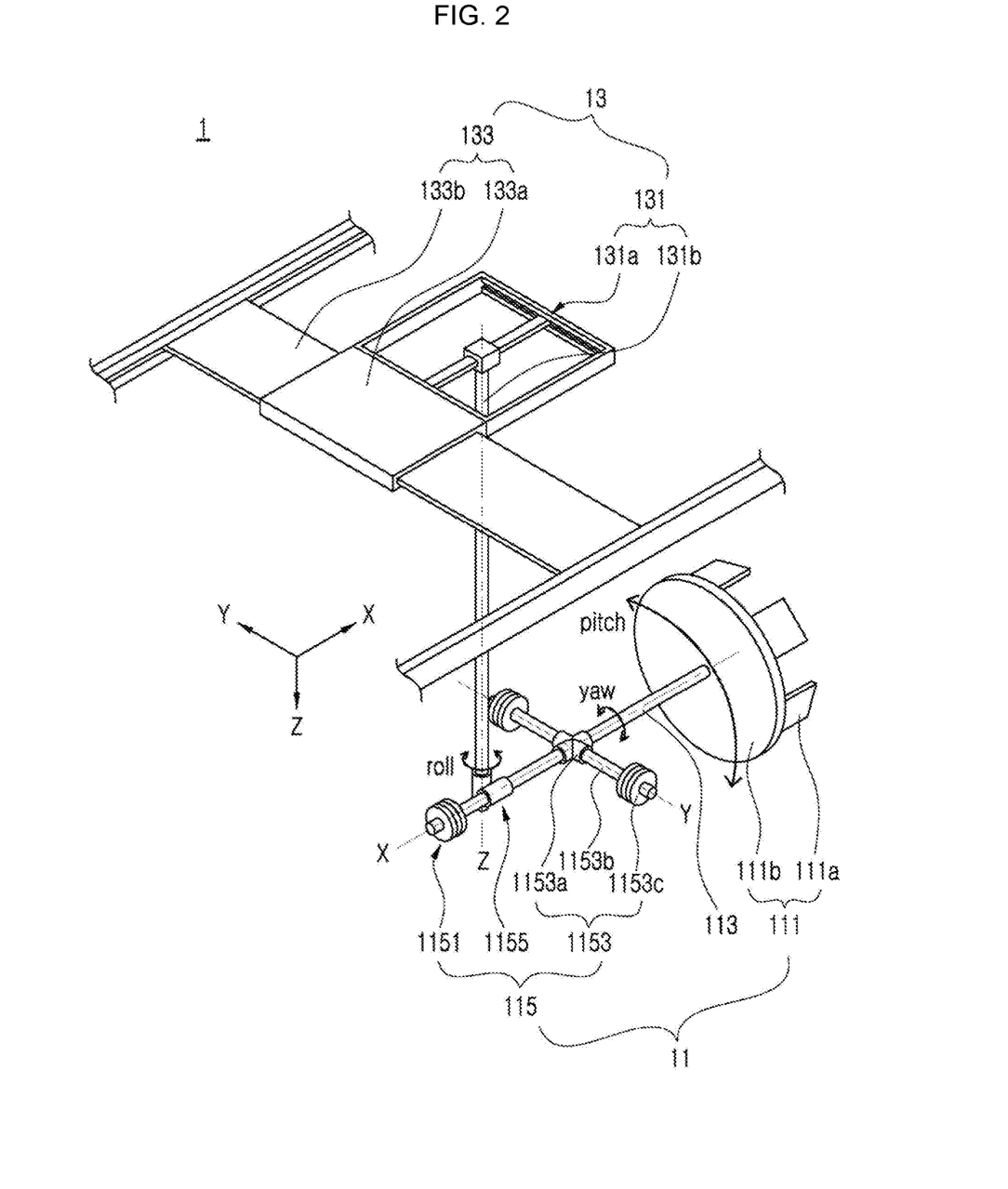
FIG. 2 is a view illustrating an active module of the docking simulator according to the exemplary embodiment of the present disclosure.
Figure 3A:
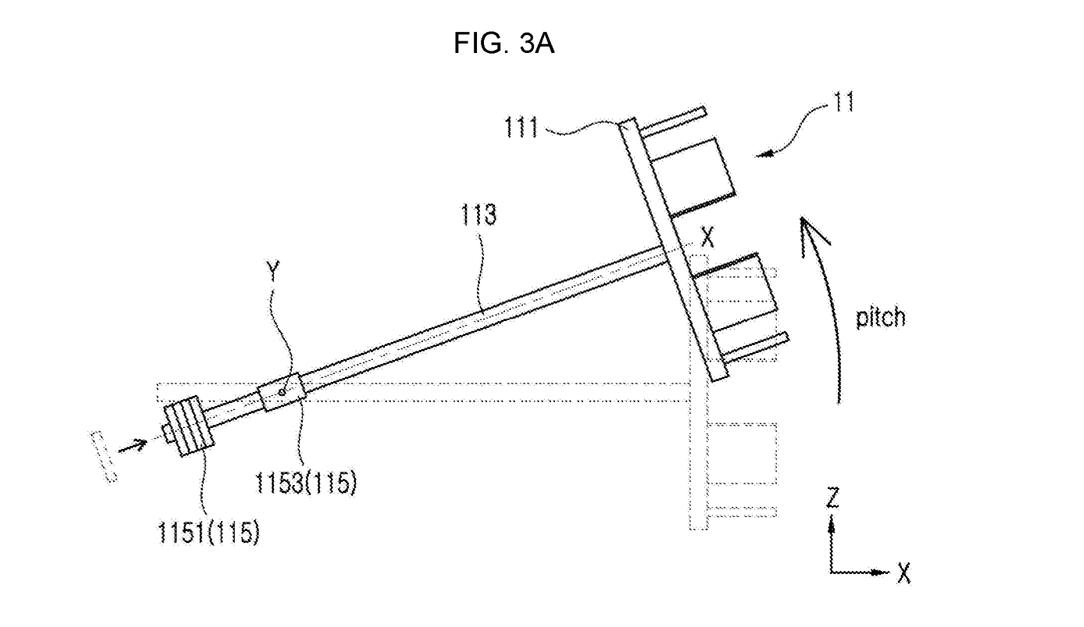
FIG. 3A and FIG. 3B are views schematically illustrating a process of adjusting pitch of a first rotating unit of the docking simulator according to the exemplary embodiment of the present disclosure.
Figure 3B:
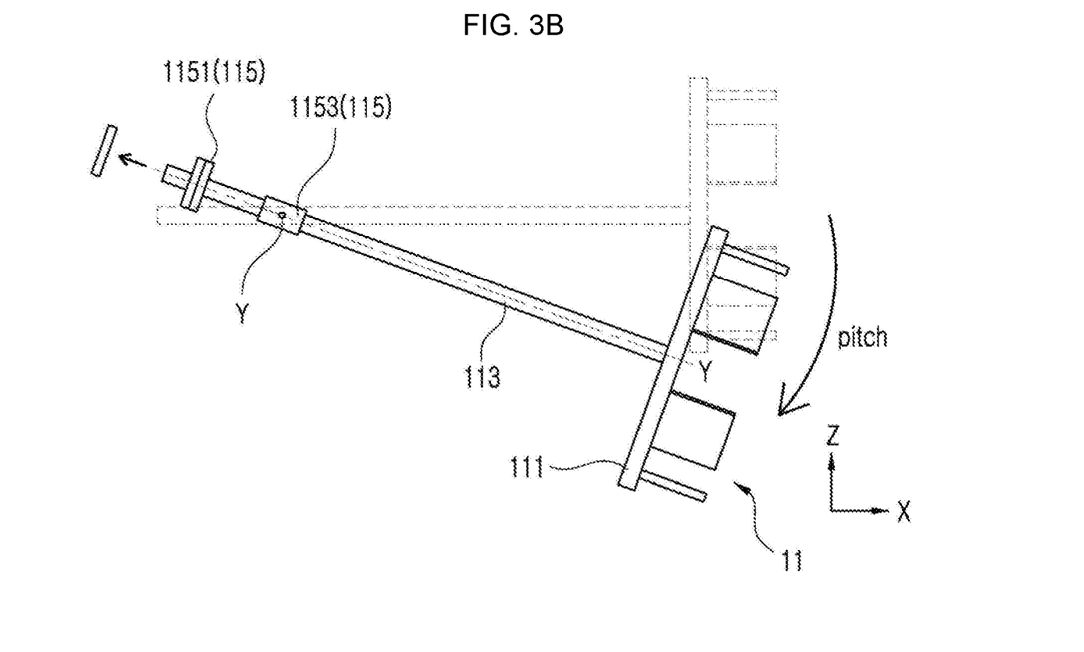
Figure 4A:
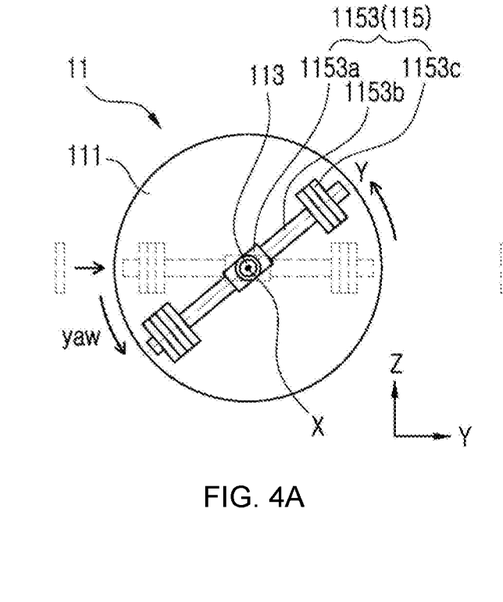
FIG. 4A, FIG. 4B, FIG. 4C, and FIG. 4D are views schematically illustrating a process of adjusting yaw of the first rotating unit of the docking simulator according to the exemplary embodiment of the present disclosure.
Figure 4B:
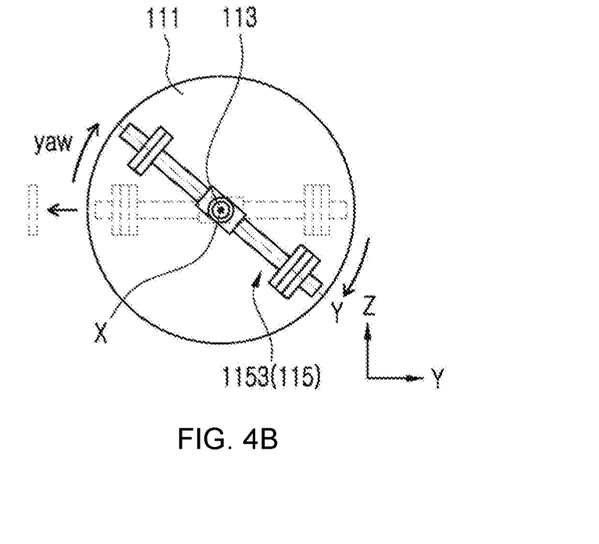
Figure 4C:
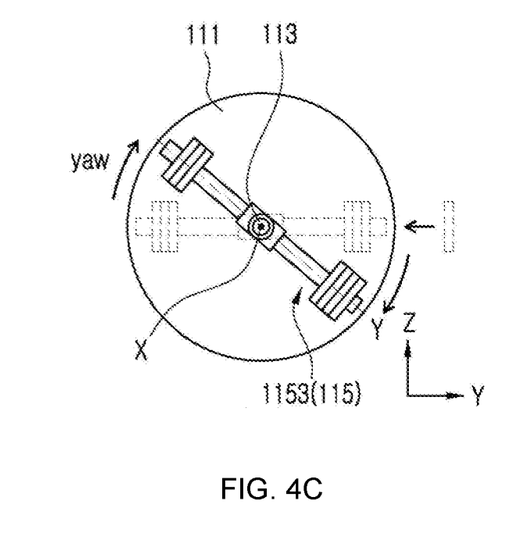
Figure 4D:
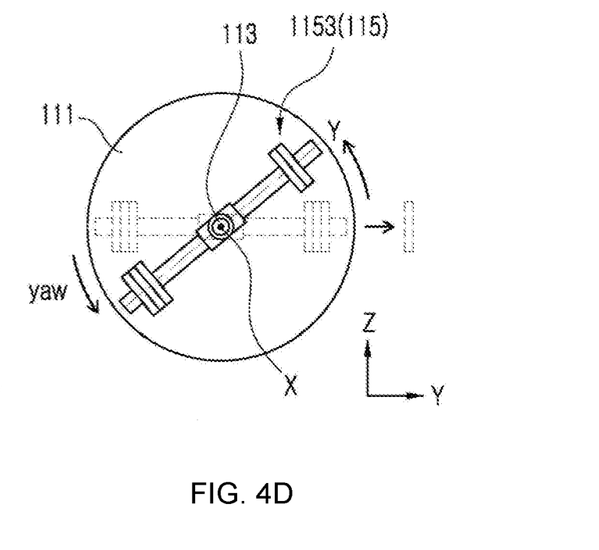
Figure 5:
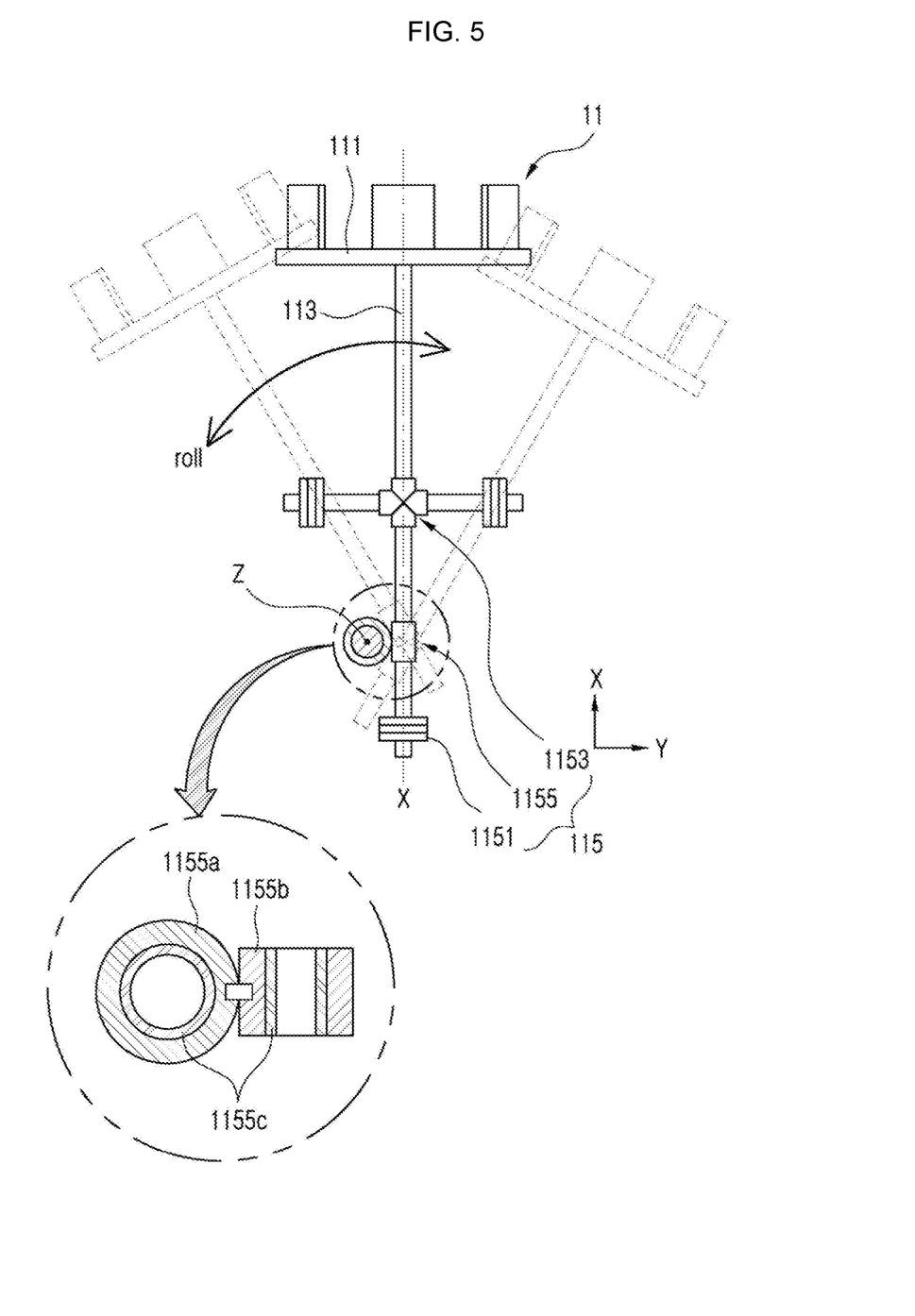
FIG. 5 is a view schematically illustrating a process of adjusting roll of the first rotating unit of the docking simulator according to the exemplary embodiment of the present disclosure.
Figure 6:
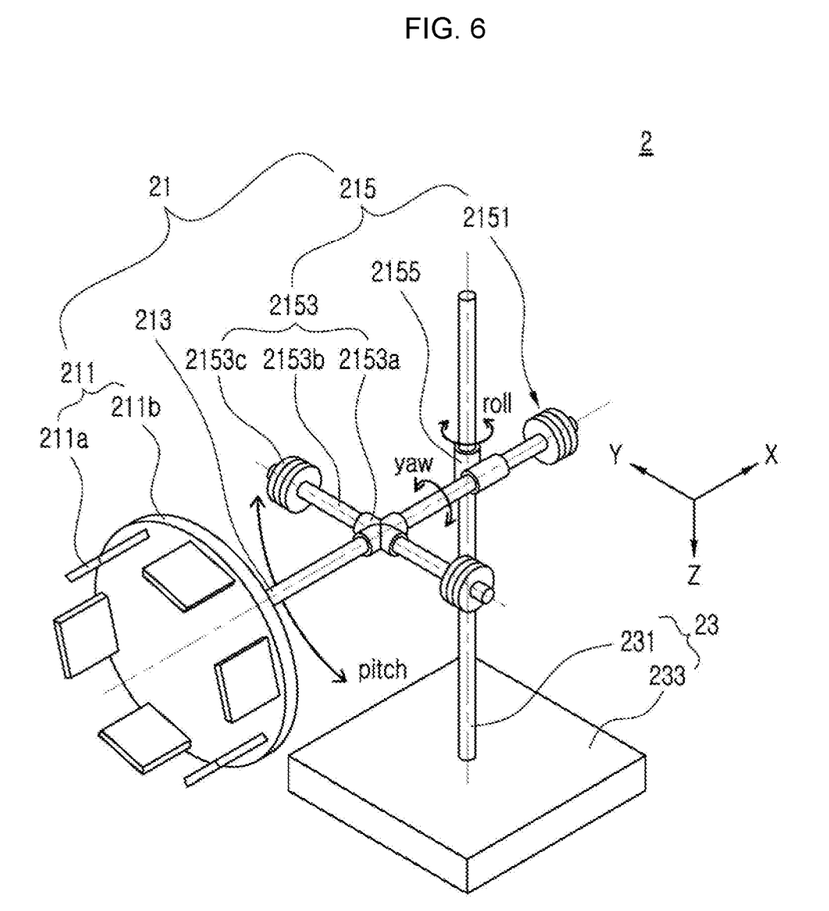
FIG. 6 is a view illustrating a passive module of the docking simulator according to the exemplary embodiment of the present disclosure.

FIG. 1 is a view schematically illustrating a docking simulator according to an exemplary embodiment of the present disclosure, FIG. 2 is a view illustrating an active module of the docking simulator according to the exemplary embodiment of the present disclosure, and FIG. 3 is a view schematically illustrating a process of adjusting pitch of a first rotating unit of the docking simulator according to the exemplary embodiment of the present disclosure. In addition, FIG. 4 is a view schematically illustrating a process of adjusting yaw of the first rotating unit of the docking simulator according to the exemplary embodiment of the present disclosure, FIG. 5 is a view schematically illustrating a process of adjusting roll of the first rotating unit of the docking simulator according to the exemplary embodiment of the present disclosure, and FIG. 6 is a view illustrating a passive module of the docking simulator according to the exemplary embodiment of the present disclosure.

Referring to FIG. 1, a docking simulator according to an exemplary embodiment of the present disclosure (hereinafter, referred to as a 'docking simulator') is a docking simulator capable of mimicking docking between two flight vehicles in a zero gravity environment, and the docking simulator includes a passive module 2 which is disposed at a preset position, and an active module 1 which performs docking with the passive module 2 by approaching the passive module 2 while performing a translational motion.

First, the active module 1 will be described in detail.

As illustrated in FIG. 1, the active module 1 has a structure capable of performing 6-degree-of-freedom motions including an X-axis motion, a Y-axis motion, a Z-axis motion, a pitch motion, a yaw motion, and a roll motion.

Referring to FIG. 2, the active module 1 may include a first rotating unit 11.

The first rotating unit 11 is disposed in the air by being spaced apart from the ground surface in order to minimize an influence of gravity, and the first rotating unit 11 may be structured to be rotatable about any one of an X axis, a Y axis, and a Z axis while maintaining balance so that the central axis (the X axis in FIG. 2) is in parallel with the ground surface.

That is, the first rotating unit 11 may be structured to be able to control any one posture, that is, pitch, yaw, and roll by being rotated about any one of the X axis, the Y axis, and the Z axis.

In more detail, the first rotating unit 11 may include a first coupling part 111 which is coupled to the passive module 2 when performing the docking, and a first support shaft 113 which is rotatably coupled to a conveying unit 13 to be described below and supports the first coupling part 111. For example, the first coupling part 111 may include probes 111*a* which are engaged with and coupled to the passive module 2 to be described below when performing the docking, and a support body 111*b* which supports the probes 111*a*. In addition, the first coupling part 111 may further include an image device and a sensor in order to transmit images and signals about the parts, which are to be docked, to a computer when performing the docking.

In addition, the first rotating unit 11 may include a first posture control unit 115 which is installed on the first support shaft 113 to maintain balance of the first support shaft 113, and controls a rotation of the first support shaft 113.

That is, the first posture control unit 115 is installed on the first support shaft 113, the first posture control unit 115 may maintain balance of the first support shaft 113 so that the first support shaft 113 disposed in the air is not tilted toward any one side and the central axis (X axis) of the first support shaft 113 is in parallel with the ground surface, and the first posture control unit 115 may control the pitch, the yaw, and the roll of the first rotating unit 11 by rotating the first support shaft 113 at a preset angle about any one of the X axis, the Y axis, and the Z axis when it is necessary to control the posture of the first support shaft 113.

Referring to FIGS. 2 and 3, the first posture control unit 115 may include a first control unit 1151 which controls the pitch.

In more detail, the first control unit 1151 is formed in the form of a weight capable of adjusting a rotation amount (rotation angle) of the first rotating unit 11 by increasing and decreasing a weight, and the first control unit 1151 is installed at an end portion of the first support shaft 113. The first control unit 1151 is additionally coupled to the first rotating unit 11 (FIG. 3A) or separated from the first rotating unit 11 (FIG. 3B) in response to a posture control condition set when performing the docking, thereby adjusting the rotation amount (rotation angle) of the first support shaft 113 about the Y axis, and thus controlling the pitch of the first rotating unit 11.

In addition, the first posture control unit 115 may include second control units 1153 which control the yaw.

Referring to FIGS. 2 and 4, each of the second control units 1153 is formed in the form of a weight capable of adjusting the rotation amount (rotation angle) of the first rotating unit 11 by increasing and decreasing a weight, and the second control units 1153 are installed at one side and the other side of the first support shaft 113, respectively, in a direction intersecting the central axis of the first support shaft 113. The second control unit 1153 is coupled to or separated from one side of the first rotating unit 11 (FIGS. 4A and 4B) or coupled to or separated from the other side of the first rotating unit 11 (FIGS. 4C and 4D) in response to the posture control condition set when performing the docking, thereby adjusting the rotation amount (rotation angle) of the first support shaft 113 about the X axis, and thus controlling the yaw of the first rotating unit 11. For example, as illustrated in FIG. 4, each of the second control units 1153 may include a coupling body 1153a which is coupled to the first support shaft 113 and has coupling means formed at opposite sides of the coupling body 1153a, a coupling shaft 1153b which is detachably coupled to the coupling means formed on the coupling body 1153a, and a weight member 1153c which may be coupled to or separated from the coupling shaft 1153b. However, the second control unit 1153 is not limited to the aforementioned configuration, and the second control unit 1153 may be modified to have various structures capable of adjusting the rotation amount (rotation angle) of the first rotating unit 11 by increasing and decreasing a weight.

In addition, the first posture control unit 115 may include a third control unit 1155 which controls the roll.

Referring to FIGS. 2 and 5, the third control unit 1155 is installed on a vertical moving unit 131b of the conveying unit 13 which is perpendicularly disposed with respect to the central axis (X axis) of the first support shaft 113, and the third control unit 1155 may control the roll of the first rotating unit 11 by adjusting the rotation amount of the first support shaft 113 about the Z axis which is a central axis of the vertical moving unit 131b, in response to the posture control condition set when performing the docking. For example, as illustrated in the enlarged part in FIG. 5, the third control unit 1155 may include a first rotating member 1155a which is coupled to the vertical moving unit 131b so as to be rotatable along an outer circumferential surface of the vertical moving unit 131b, and a second rotating member 1155b which is coupled to the first rotating member 1155a so as to be rotatable about the Y axis and has an inner circumferential surface to which the first support shaft 113 is rotatably coupled. Here, bearings 1155c may be installed in the first rotating member 1155a and the second rotating member 1155b, respectively. However, the third control unit 1155 is not limited to the aforementioned configuration, and the third control unit 1155 may be modified to have various structures capable of being rotatable about the Z axis and supporting the first support shaft 113 so that the first support shaft 113 is rotatable about the X axis and the Y axis.

Meanwhile, the active module 1 may include the conveying unit 13.

Referring to FIGS. 1 and 2, the conveying unit 13 may be structured to support the first rotating unit 11 so that the first rotating unit 11 is disposed in the air, and the conveying unit 13 may be structured to be movable straight in a direction of any one of the X axis, Y axis, and the Z axis.

In more detail, the conveying unit 13 may include a first straight moving unit 131 which supports the first rotating unit 11 and is movable in the directions of the X axis, the Y axis, and the Z axis, and a second straight moving unit 133 which supports the first straight moving unit 131 and is movable in the directions of the X axis and the Y axis.

The first straight moving unit 131 supports the first rotating unit 11, and the first straight moving unit 131 may be structured to precisely adjust the position of the first rotating unit 11 when performing the docking by moving the first rotating unit 11 straight in the directions of the X axis, the Y axis, and the Z axis when the first rotating unit 11 is positioned within a preset distance from the passive module 2 to be described below.

In more detail, the first straight moving unit 131 may include a horizontal moving unit 131a which is installed on the second straight moving unit 133 and moves straight in a longitudinal direction (Y-axis direction) of the second straight moving unit 133, and the vertical moving unit 131b which is installed on the horizontal moving unit 131a, may move straight in the directions of the X axis and the Y axis on the plane of the horizontal moving unit 131a, extends in the Z-axis direction from a fixing unit, and moves the first rotating unit 11, which is installed outside, straight upward and downward in the Z-axis direction. For example, the horizontal moving unit 131a and the vertical moving unit 131b may be operated by a power device (not illustrated) that enables precise control.

The second straight moving unit 133 may be structured to support the first straight moving unit 131, and quickly move the first straight moving unit 131 straight in the directions of the X axis and the Y axis until the first rotating unit 11 is positioned within the preset distance from the passive module 2.

In more detail, the second straight moving unit 133 may include a first main moving unit 133a which is coupled to the first straight moving unit 131 and may move straight in the Y-axis direction, and a second main moving unit 133b which is coupled to the first main moving unit 133a and moves the first main moving unit 133a straight in the X-axis direction. Here, the second main moving unit 133b, which performs a translational motion when performing the docking, may be operated by a thruster (not illustrated) which may operate by combusting gas fuel or the like in order to mimic the docking situation close to an actual docking situation. Furthermore, a pulse width modulation (PWM) method, which is applied to control a thruster of an actual flight vehicle, may also be applied to a control signal for controlling the thruster. That is, the docking simulator operates the second main moving unit 133b, which performs the translational motion, by using the thruster, and designs a drive signal for the thruster to meet the PWM method in order to implement a verification environment more similar to that of actual docking.

Next, the passive module 2 will be described in detail.

The passive module 2 is disposed at a preset position, and as illustrated in FIG. 1, the passive module 2 has a structure capable of performing 3-degree-of-freedom motions including the pitch motion, the yaw motion, and the roll motion.

Referring to FIG. 6, the passive module 2 may include a second rotating unit 21.

The second rotating unit 21 is disposed in the air by being spaced apart from the ground surface in order to minimize an influence of gravity, and the second rotating unit 21 may be structured to be rotatable about any one of the X axis, the Y axis, and the Z axis while maintaining balance so that the central axis (X axis) is in parallel with the ground surface.

That is, the second rotating unit 21 may be structured to be able to control any one posture, that is, pitch, yaw, and roll by being rotated about any one of the X axis, the Y axis, and the Z axis.

In more detail, the second rotating unit 21 may include a second coupling part 211 which is coupled to the active module 1 when performing the docking, and a second support shaft 213 which is rotatably coupled to a support unit 23 to be described below and supports the second coupling part 211. For example, the second coupling part 211 may include probes 211a which are engaged with and coupled to the first coupling part 111 of the active module 1 when performing the docking, and a support body 211b which supports the probes 211a. In addition, the second coupling part 211 may further include an image device and a sensor in order to transmit images and signals about the parts, which are to be docked, to the computer when performing the docking.

In addition, the second rotating unit 21 may include a second posture control unit 215 which is installed on the second support shaft 213 to maintain balance of the second support shaft 213, and controls a rotation of the second support shaft 213.

That is, the second posture control unit 215 is formed to have a structure similar to that of the first posture control unit 115, the second posture control unit 215 is installed on the second support shaft 213, the second posture control unit 215 may maintain balance of the second support shaft 213 so that the second support shaft 213 disposed in the air is not tilted toward any one side and the central axis (X axis) of the second support shaft 213 is in parallel with the ground surface, and the second posture control unit 215 may control the pitch, the yaw, and the roll of the second rotating unit 21 by rotating the second support shaft 213 at a preset angle about any one of the X axis, the Y axis, and the Z axis when it is necessary to control the posture of the second support shaft 213.

In more detail, the second posture control unit 215 may include a first control unit 2151 which controls the pitch, second control units 2153 which control the yaw, and a third control unit 2155 which controls the roll.

The first control unit 2151 is formed in the form of a weight capable of adjusting a rotation amount (rotation angle) of the second rotating unit 21 by increasing and decreasing a weight, and the first control unit 2151 is installed at an end portion of the second support shaft 213. The first control unit 2151 is additionally coupled to the second rotating unit 21 or separated from the second rotating unit 21 in response to a posture control condition set when performing the docking, thereby adjusting the rotation amount (rotation angle) of the second support shaft 213 about the Y axis, and thus controlling the pitch of the second rotating unit 21.

Each of the second control units 2153 is formed in the form of a weight capable of adjusting the rotation amount (rotation angle) of the second rotating unit 21 by increasing and decreasing a weight, and the second control units 2153 are installed at one side and the other side of the second support shaft 213, respectively, in a direction intersecting the central axis of the second support shaft 213. The second control unit 2153 is coupled to or separated from one side of the second rotating unit 21 or coupled to or separated from the other side of the second rotating unit 21 in response to the posture control condition set when performing the docking, thereby adjusting the rotation amount (rotation angle) of the second support shaft 213 about the X axis, and thus controlling the yaw of the second rotating unit 21. For example, each of the second control units 2153 may include a coupling body 2153a which is coupled to the second support shaft 213 and has coupling means formed at opposite sides of the coupling body 2153a, a coupling shaft 2153b which is detachably coupled to the coupling means formed on the coupling body 2153a, and a weight member 2153c which may be coupled to or separated from the coupling shaft 2153b. However, the second control unit 2153 is not limited to the aforementioned configuration, and the second control unit 2153 may be modified to have various structures capable of adjusting the rotation amount (rotation angle) of the second rotating unit 21 by increasing and decreasing a weight.

The third control unit 2155 is installed on a support shaft member 231 of the support unit 23 to be described below which is perpendicularly disposed with respect to the central axis of the second support shaft 213, and may control the roll of the second rotating unit 21 by adjusting the rotation amount of the second support shaft 213 about the Z axis which is the central axis of the support shaft member 231 in respect to the posture control condition set when performing the docking. For example, although not illustrated in the drawings, the third control unit 2155 may include a first rotating member which is coupled to the support shaft member 231 so as to be rotatable along an outer circumferential surface of the support shaft member 231, and a second rotating member which is coupled to the first rotating member so as to be rotatable about the Y axis and has an inner circumferential surface to which the second support shaft 213 is rotatably coupled. In addition, bearings may be installed in the first rotating member and the second rotating member, respectively. However, the third control unit 2155 is not limited to the aforementioned configuration, and the third control unit 2155 may be modified to have various structures capable of being rotatable about the Z axis and supporting the second support shaft 213 so that the second support shaft 213 is rotatable about the X axis and the Y axis.

Meanwhile, the passive module 2 may include the support unit 23.

Referring to FIGS. 1 and 6, the support unit 23 may be structured to support the second rotating unit 21 so that the second rotating unit 21 may be disposed in the air.

In more detail, the support unit 23 may include the support shaft member 231 which supports the second rotating unit 21, and a fixing plate 233 which is installed on the ground surface and supports the support shaft member 231.

According to the present disclosure, the docking simulator capable of performing, on the ground, a logic verification test for rendezvous docking between the two flight vehicles in the space in the zero gravity environment is implemented, and as a result, it is possible to perform more various logic verification tests for rendezvous docking by mimicking the rendezvous docking by using actual objects, and it is possible to derive optimum rendezvous docking logic data by finding problems occurring when performing the actual rendezvous docking and by solving the problems.

In addition, the active module connected to the passive module is structured to be able to perform the 6-degree-of-freedom motions including the X-axis motion, the Y-axis motion, the Z-axis motion, the pitch motion, the yaw motion, and the roll motion, and as a result, it is possible to implement a more precise docking process.

What is claimed is:

1. A docking simulator capable of mimicking docking between two flight vehicles in a zero gravity environment, the docking simulator comprising:
    a passive module which is disposed at a preset position; and
    an active module which performs docking with the passive module by approaching the passive module while performing a translational motion,
    wherein the active module includes:
        a first rotating unit which is disposed in the air by being spaced apart from a ground surface, maintains balance so that a central axis of the first rotating unit is in parallel with the ground surface, and rotates about any one of an X axis, a Y axis, and a Z axis; and
        a conveying unit which supports the first rotating unit so that the first rotating unit is disposed in the air, and moves straight in a direction of any one of the X axis, the Y axis, and the Z axis,
    wherein the first rotating unit includes:
        a first coupling part which is coupled to the passive module when performing the docking;
        a first support shaft which is rotatably coupled to the conveying unit and supports the first coupling part; and
        a first posture control unit which is installed on the first support shaft to maintain balance of the first support shaft, and controls a rotation of the first support shaft.

2. The docking simulator according to claim 1, wherein the active module has a structure capable of performing 6-degree-of-freedom motions including an X-axis motion, a Y-axis motion, a Z-axis motion, a pitch motion, a yaw motion, and a roll motion.

3. The docking simulator according to claim 1, wherein the first posture control unit includes:
    a first control unit which is installed at an end portion of the first support shaft, and controls the pitch of the first rotating unit by adjusting a rotation amount of the first support shaft about the Y axis;
    second control units which are installed at one side and the other side of the first support shaft, respectively, in a direction intersecting a central axis of the first support shaft, and controls the yaw of the first rotating unit by adjusting a rotation amount of the first support shaft about the X axis; and
    a third control unit which is installed on the conveying unit, and controls the roll of the first rotating unit by adjusting a rotation amount of the first support shaft about the Z axis.

4. The docking simulator according to claim 1, wherein the conveying unit includes:
    a first straight moving unit which supports the first rotating unit, and moves the first rotating unit straight in the directions of the X axis, the Y axis, and the Z axis when the first rotating unit is positioned within a preset distance from the passive module; and
    a second straight moving unit which supports the first straight moving unit, and moves the first straight moving unit straight in the directions of the X axis and the Y axis until the first rotating unit is positioned within a preset distance from the passive module.

5. The docking simulator according to claim 4, wherein the first straight moving unit includes:
    a horizontal moving unit which is installed on the second straight moving unit and moves straight in a longitudinal direction of the second straight moving unit; and
    a vertical moving unit which is installed on the horizontal moving unit, moves in the directions of the X axis and the Y axis, extends in the Z-axis direction from the horizontal moving unit, and moves the first rotating unit, which is installed outside, straight in the Z-axis direction.

6. The docking simulator according to claim 4, wherein the second straight moving unit includes:
    a first main moving unit which is coupled to the first straight moving unit, and moves straight in the Y-axis direction; and
    a second main moving unit which is coupled to the first main moving unit and moves the first main moving unit straight in the X-axis direction.

7. The docking simulator according to claim 1, wherein the passive module includes:
    a second rotating unit which is disposed in the air by being spaced apart from the ground surface, maintains balance so that a central axis of the second rotating unit is in parallel with the ground surface, and rotates about at least one of an X axis, a Y axis, and a Z axis; and
    a support unit which supports the second rotating unit so that the second rotating unit is disposed in the air.

8. The docking simulator according to claim 7, wherein the second rotating unit includes:
    a second coupling part which is coupled to the active module when performing the docking;
    a second support shaft which is rotatably coupled to the support unit and supports the second coupling part; and
    a second posture control unit which is installed on the second support shaft to maintain balance of the second support shaft, and controls a rotation of the second support shaft.

9. The docking simulator according to claim 8, wherein the second posture control unit includes:
    a first control unit which is installed at an end portion of the second support shaft, and controls the pitch of the second rotating unit by adjusting a rotation amount of the second support shaft about the Y axis;
    second control units which are installed at one side and the other side of the second support shaft, respectively, in a direction intersecting a central axis of the second support shaft, and controls the yaw of the second rotating unit by adjusting a rotation amount of the second support shaft about the X axis; and
    a third control unit which is installed on the support unit, and controls the roll of the second rotating unit by adjusting a rotation amount of the second support shaft about the Z axis.

10. The docking simulator according to claim 7, wherein the support unit includes:

a support shaft member which supports the second rotating unit; and a fixing plate which is installed on the ground surface and supports the support shaft member.

* * * * *